United States Patent
Walton

(10) Patent No.: US 6,195,770 B1
(45) Date of Patent: Feb. 27, 2001

(54) DATA STORAGE SYSTEM

(75) Inventor: John K. Walton, Mendon, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/052,266

(22) Filed: Mar. 31, 1998

(51) Int. Cl.$^7$ .................................................. G06F 11/22
(52) U.S. Cl. .............................. 714/53; 714/57; 710/35; 711/5
(58) Field of Search ............................... 710/35; 714/48, 714/42, 45, 52, 53, 54, 57, 723, 805; 711/114, 2, 5

(56) References Cited

U.S. PATENT DOCUMENTS

| | | | |
|---|---|---|---|
| 4,468,731 | * | 8/1984 | Johnson et al. ....................... 364/200 |
| 4,535,455 | * | 8/1985 | Peterson .................................. 371/13 |
| 5,001,624 | * | 3/1991 | Hoffman et al. ..................... 364/200 |
| 5,043,937 | * | 8/1991 | Glaise et al. ........................... 364/900 |
| 5,206,939 | * | 4/1993 | Yanai et al. ............................ 395/400 |
| 5,410,545 | * | 4/1995 | Porter et al. ......................... 371/21.6 |
| 5,469,558 | * | 11/1995 | Lieberman et al. ................. 395/285 |
| 5,610,929 | * | 3/1997 | Yamamoto ........................... 371/40.1 |
| 5,652,856 | * | 7/1997 | Santeler et al. ...................... 395/432 |
| 6,003,144 | * | 12/1999 | Olarig et al. ............................ 714/42 |
| 6,085,261 | * | 7/2000 | McIntyre, Jr. et al. ................ 710/35 |

* cited by examiner

*Primary Examiner*—Robert W. Beausoliel, Jr.
*Assistant Examiner*—Scott T. Baderman
(74) *Attorney, Agent, or Firm*—Daly, Crowley & Mofford, LLP

(57) ABSTRACT

A data storage system wherein a host computer section having host computer processors for processing data is coupled to a bank of disk drives through an interface. The interface includes a plurality of controllers coupled to a bus. Each one of the controllers is adapted to request a data transfer between the bus and an addressed one of the addressable memories. Each such request is transmitted to the addressed one of the memories in bursts. Each one of the bursts in a request has a tag unique to such request. The bursts from one of the requesting controllers to the one of the addressed memories addressed by such one of the controllers are interleaved with bursts of requests from another one of the requesting controllers to the same or another one of the addressed memories addressed by said another one of the controllers. Each one of the addressable memories has a control logic coupled to the bus for receiving the request from the one of the controllers addressing such one of the addressable memories. The control logic has a storage section. The addressable memory includes a random access memory coupled to the bus through the control logic. An error detector is included in the addressable memory for detecting an error in the addressable memory when transferring data between the bus and the random access memory. The control logic stores in the storage section a cumulative error message produced in response to the error detector processing each one of the bursts of requests and for reports the cumulative error to the one of the controllers making such request.

16 Claims, 5 Drawing Sheets

DATA STORAGE SYSTEM

BACKGROUND OF THE INVENTION

This invention relates generally to data storage systems, and more particularly to data storage systems adapted to interface with a host computer system.

As is known in the art, large mainframe or open system (i.e., host) computer systems require large capacity data storage systems. These host computer systems generally includes data processors which perform many operations (i.e., functions) on data introduced to the computer system through peripherals including the data storage system. The results of these operations are output to peripherals, including the storage system.

One type of data storage system is a magnetic disk storage system. Here a bank of disk drives and the host computer system are coupled together through an interface. The interface includes CPU, or "front end", controllers and "back end" disk controllers. The interface operates the controllers in such a way that they are transparent to the computer. That is, data is stored in, and retrieved from, the bank of disk drives in such a way that the host computer system merely thinks it is operating with one host computer memory. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. Patent, the interface may also include, in addition to the CPU controllers and disk controllers, addressable cache memories. The cache memory is a semiconductor memory and is provided to rapidly store data from the host computer system before storage in the disk drives, and, on the other hand, store data from the disk drives prior to being sent to the host computer. The cache memory being a semiconductor memory, as distinguished from a magnetic memory as in the case of the disk drives, is much faster than the disk drives in reading and writing data.

The CPU controllers, disk controllers and cache memory are interconnected through a backplane printed circuit board. More particularly, disk controllers are mounted on disk controller printed circuit boards. CPU controllers are mounted on CPU controller printed circuit boards. And, cache memories are mounted on cache memory printed circuit boards. The disk controller, CPU controller and cache memory printed circuit boards plug into the backplane printed circuit board. In order to provide data integrity in case of a failure in a controller, the backplane printed circuit board has a pair of busses. One set the disk controllers is connected to one bus and another set of the disk controllers is connected to the other bus. Likewise, one set the CPU controllers is connected to one bus and another set of the CPU controllers is connected to the other bus. The cache memories are connected to both busses. Thus, the use of two busses provides a degree of redundancy to protect against a total system failure in the event that the controllers, or disk drives connected to one bus fail.

In one system, the communication to the controllers and the cache memories is through a pair of bi-directional lines. Typically one bi-directional line is for data and the other bi-directional line is for control signals. As noted above, each of the controllers is connected to only one of the busses and, therefore, only one pair of bi-directional lines are electrically connected to the controllers; however, because each one of the cache memories is connected to both busses, each cache memory has two pairs of bi-directional lines.

Thus, in transferring data between the host computer and the bank of disk drives the controllers operate to pass such data through the cache memory. The data transfer is in accordance with a timing protocol. One such protocol is described in co-pending patent application Ser. No. 08/701,868 filed Aug. 23, 1996, entitled "Data Storage System Having Row/Column Address Parity Checking", inventors Eli Leshem and John K. Walton, assigned to the same assignee as the present invention, the entire subject matter thereof being incorporated herein by reference. As described in such co-pending patent application, the basic process used to effect a data transfer includes the following four sequential steps: (1) a controller selects one of the addressable memories with an address and provides a command, such as a read command or a write command, and if a write command, the data to be written into the addressed memory is placed on the bus; (2) the data is transferred between the bus and the memory; (3) a error status signal (i.e., whether there were any errors, such as parity check detecting errors in the data transfer, a correctable error, or an un-correctable error, for example) is presented by the addressable memory to the bus; and (4) the controller determines from the error status signal whether the data transfer was performed correctly. If the data transfer was not performed correctly, the controller goes through the cycle again. As described in the co-pending patent application, there is a delay in transferring data between the bus and the random access memory (RAM) included in the addressable memory. Thus, there is a delay between the time the data on the bus is transferred to the addressable memory and the time the data is stored into the RAM of such addressable memory.

As is also known in the art, the data to be transferred may be, for example, 4.096 Kbytes. However, the 4.096 Kbytes of data is transferred in bursts (or batches) having a fixed number of bytes, for example bursts having 256 bytes. Thus, to complete the 4.096 Kbyte data transfer, a series, or sequence, of 16 bursts are required. It is also known in the art, different ones of the controllers may be transferring data between the host computer and the bank of disk drives through the memory. Further, the bus through which the data is transferred only allows one controller to have access to the bus at any one time. Thus, any one of the addressable cache memories may be process requests from one controller while interleaved with such requests the same memory may process requests from other ones of the controllers. Thus, the bursts processed at the request of one controller are interleaved with bursts processed at the request of other ones of the controllers.

In transferring the data in each burst between the bus and the addressed addressable memory, the four step protocol summarized above is used. As noted, there is a delay in transferring data between the bus and the random access memory (RAM) included in the addressable memory. Thus, there is a delay, $\Delta$, between the time the data on the bus is transferred to the addressable memory and the time the data is stored into the RAM of such addressable memory. It follows then, that if there are sixteen bursts for the data transfer, there is a 16$\Delta$ delay included in the data transfer process. It is also noted that if there is an error in the data transfer of any one of the bursts in the data transfer, the controller must process the data again (i.e., repeat the, up to, 16 burst processing.

SUMMARY OF THE INVENTION

In accordance with the invention, a data storage system is provided wherein a host computer section having host computer processors for processing data is coupled to a bank of disk drives through an interface. The interface includes a plurality of controllers coupled to a bus. Each one of the controllers is adapted to request a data transfer between the bus and an addressed one of the addressable memories. Each such request is transmitted to the addressed one of the memories in bursts. Each one of the bursts in a request has a tag unique to such request. The bursts from one of the requesting controllers to the one of the addressed memories addressed by such one of the controllers are interleaved with bursts of requests from another one of the requesting controllers to the same or another one of the addressed memories addressed by said another one of the controllers. Each one of the addressable memories has a control logic section coupled to the bus for receiving the request from the one of the controllers addressing such one of the addressable memories. The control logic section has a storage section. The addressable memory includes a random access memory region coupled to the bus through a buffer memory. An error detector is included in the buffer memory for detecting an error in the addressable memory when transferring data between the bus and the random access memory region. The control logic section stores, in the storage section thereof, a cumulative error status produced in response to the error detector processing each one of the bursts of data transfer requests. The control logic section reports the cumulative error status to the one of the controllers making such data transfer request.

With such an arrangement, in the absence of an un-correctable error being detected in a processed burst, a final, i.e., cumulative, error status is sent to the requesting controller after all of the bursts have been processed by the addressable memory rather than reporting an error status after each burst is processed thereby reducing the time the bus is used in reporting error status to the requesting controller.

In accordance with another feature of the invention, the controller provides with each of the data transfer requests a beginning burst indication and a final burst indication. The controller may also provide a continuation burst indication when there are more than two bursts. The control logic section responds to these indication in providing the cumulative error.

In accordance with another feature of the invention, the control logic section identifies a plurality of different types of errors (e.g. no error (OK), CORRECTABLE, or UN-CORRECTABLE); when a first one of such types is identified such error (e.g. CORRECTABLE is accumulated in the control logic section and the accumulated error is reported in response to the final burst indication and when another one of the types of errors (e.g. UN-CORRECTABLE) is identified it is reported when such error is detected.

BRIEF DESCRIPTION OF THE DRAWING

Referring now to the accompanying drawings.

DESCRIPTION OF THE PREFERRED EMBODIMENTS

Figure 1:
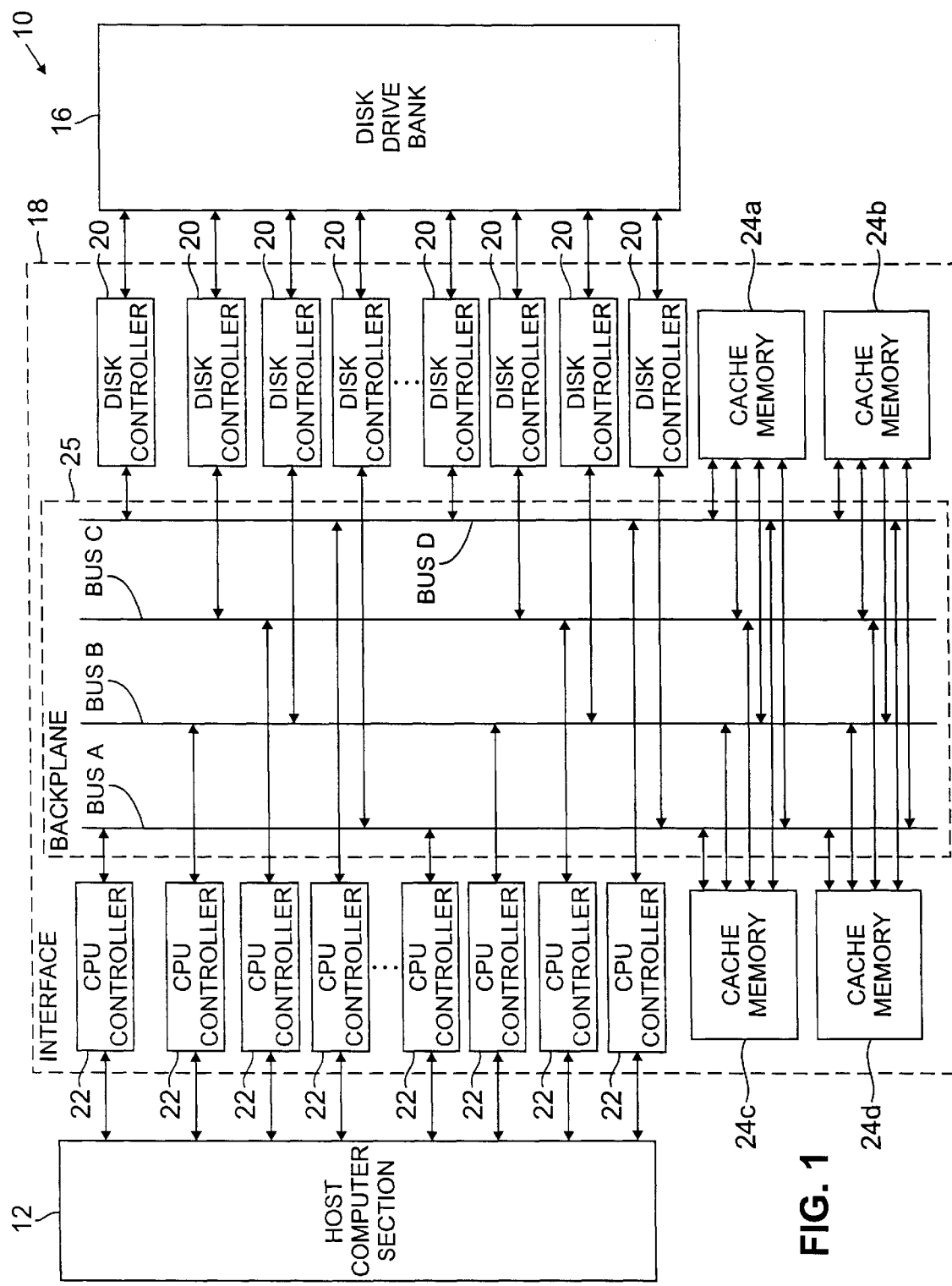
FIG. 1 is a block diagram of a computer system using a data storage system in accordance with the invention.

Referring now to FIG. 1, a computer system 10 is shown. The computer system 10 includes a host computer section 12 (e.g., a main frame or open systems computer section) having main frame processors, not shown, for processing data. Portions of the processed data are stored in, and retrieved data from, a bank 16 of disk drives through an interface 18.

The interface 18 includes disk controllers 20, central processor unit (CPU) controllers 22 and addressable cache memories 24a, 24b, 24c, and 24d electrically interconnected through a backplane 25, here four CONTROL/DATA buses; i.e., an A bus, a B bus, a C bus, and a D bus, as shown. The addressable memories 24a, 24b, 24c and 24d.

More particularly, in order to provide data integrity in case of a failure in a disk controller 20 or CPU controller 22, the four of CONTROL/DATA buses (i.e., A bus, B bus, C bus and D bus) are provided. One portion of the disk controllers 20 is connected to one of the A bus, a second portion to the B bus, a third portion to the C bus and the remaining portion to the D bus. Likewise, one portion of the CPU controllers 22 is connected to the A bus, a second portion to the B bus, a third portion to the C bus and the remaining portion to the D bus. The addressable memories 24a, 24b, 24c and 24d are connected to all four CONTROL/DATA buses, (i.e., the A bus, the B bus, the C bus and the D bus) as shown.

Each one of the controllers 20, 22 is adapted to assert on the CONTROL/DATA bus coupled thereto during a controller 20, 22 initiated control/data bus assert interval address control signal, including: (A) memory address signal; (B) memory command including a write operation request, a read operation request, and clock signals. A timing protocol, modified as described herein below, suitable for use in the system 10 is described in my co-pending patent application entitled "TIMING PROTOCOL FOR A DATA STORAGE SYSTEM", filed on Dec. 23, 1997, assigned to the same assignee as the present invention, the entire subject matter thereof being incorporated herein by reference. Briefly, the protocol described in such co-pending patent application reports error status on a separate "ending status" portion of the bus. As will be described hereinafter, the error detected results, (e.g., either a no error status (OK), a correctable error status (CORRECTABLE), or an un-correctable error status (UN-CORRECTABLE)) is reported back to the requesting controller on the separate "ending status" portion of such one of the buses thereby enabling commencement of a second data transfer burst before the error status is reported to the controller 20, 22 requesting the data transfer request.

Figure 2:
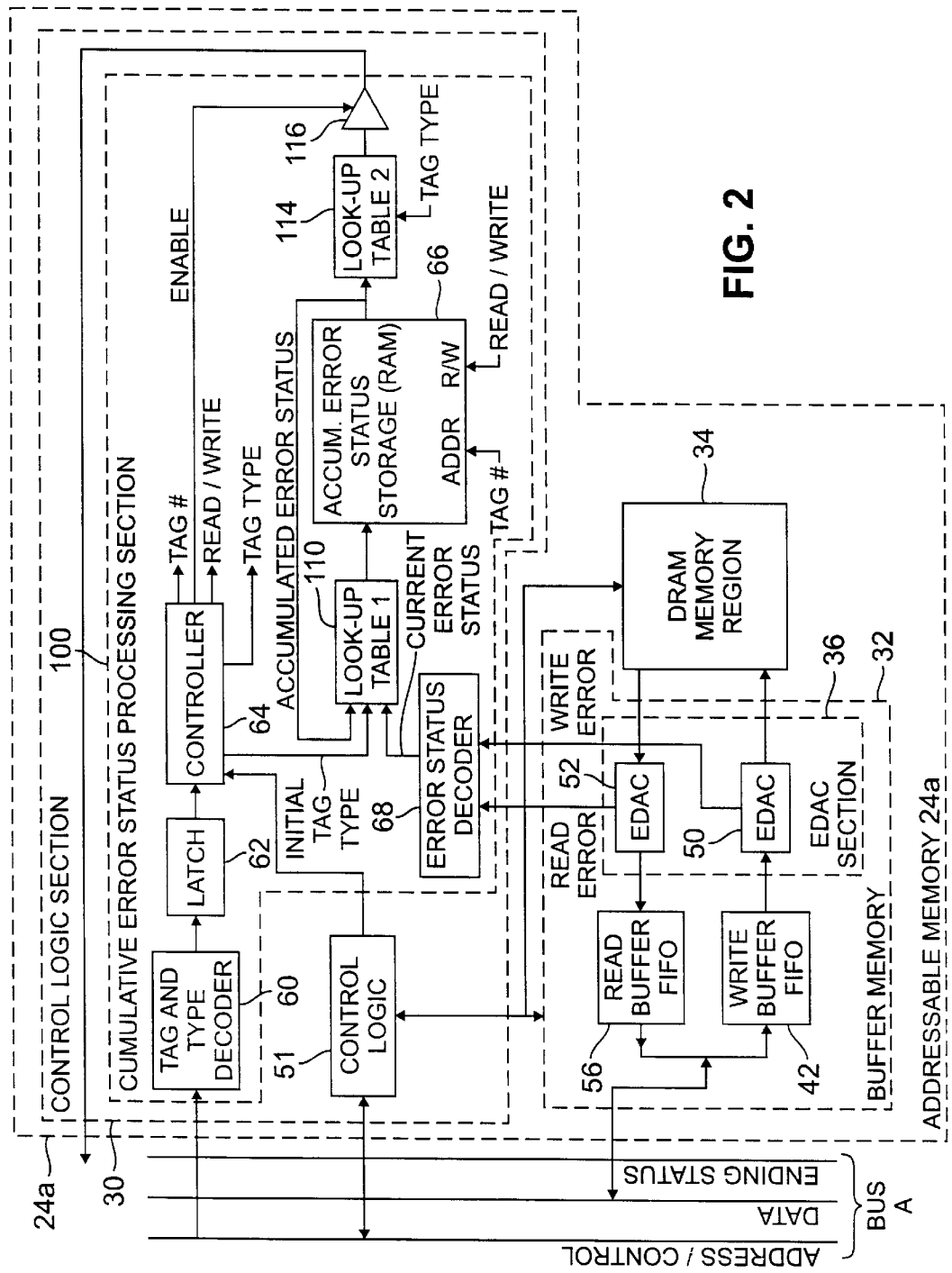
FIG. 2 is a block diagram of an exemplary one of an addressable memory used in the system in FIG. 1.

Each one of the addressable memories 24a–24d is identical in construction, an exemplary one thereof, here addressable memory 24a being shown in FIG. 2 to include a control logic section 30, a buffer memory 32 and a DRAM memory region 34. Reference is made to co-pending patent application entitled "Memory System" inventor John K. Walton, assigned to same assignee as the present invention and filed on the same date as this patent application, the entire subject matter thereof being incorporated into this application by reference. Suffice it to say here, however, that the buffer memory 32 includes an Error Detection And Correction (EDAC) section 36 for reporting errors to the control logic section 30. The EDAC section 36 is adapted to correct "correctable errors" and to detect "un-correctable" errors. The EDAC section 36 identifies these errors in such a way that the control logic section 30 is able to categorize the EDAC detected error reported to it by the buffer memory 32 as either: OK; CORRECTABLE; or, UN-CORRECTABLE.

The addressable memory 24a, for example, includes a random access memory region 34, as described in the above and described in more detail in the above referenced co-pending patent application filed on the same date as this patent application. The DRAM memory region 34 is coupled to the bus A, for example, through the control logic section 30 and through the buffer memory 32. The EDAC section 36 in the buffer memory 32 is adapted to detect an error in the addressable memory 24a when transferring data between the bus A, for example, and the DRAM memory region 34. The control logic section 30 stores in the cumulative error status storage section 100 a cumulative error message produced in response to the EDAC section 36 processing each one of the bursts of data transfer requests and reports the cumulative error to the one of the controllers 20, 22 making such data transfer request via the "ending status" portion of the bus A, for example. Thus, in the case where only OK and/or CORRECTABLE type errors were reported by the EDAC section 36 during the entire data transfer, only a final, i.e., cumulative, error is sent to the requesting controller 20, 22 after all of the bursts in the data transfer have been processed by the addressable memory 24a rather than reporting an error after each burst is processed. This process thereby reduces the time the bus A, for example. is used in reporting errors to the requesting controller 20, 22.

More particularly, the controller 20, 22 provides ith each of the data transfer requests a beginning burst indication and a final burst indication. The controller 20, 22 may also provide a continuation burst indication when there are more than two bursts. The control logic section responds to these indications in providing the cumulative error. The control logic section 30 identifies a plurality of different types of errors (e.g. OK, CORRECTABLE, UN-CORRECTABLE); when a first one of such types is identified such error (e.g. CORRECTABLE) is accumulated and the accumulated error is reported to the data transfer requesting controller 20, 22 in response to the final burst indication and when another one of the types of errors (e.g. UN-CORRECTABLE) is identified it is reported when such error is detected.

More particularly, and referring to buffer memory 32, as described in my co-pending patent application entitled "Memory Having Error Correction and Detection", mentioned above, the EDAC section 36 is used during writing data into the DRAM memory region 34 and reading data from the DRAM memory region 34. As described in such co-pending patent application, the data on the data portion bus A, for example, is 64 bits and there are 8 redundant bits, i.e., a 72 bit word. The 72 bit word is written into a write FIFO 42 in the buffer memory 32. When read from the write FIFO 42, the 72 bit word is passed to the first EDAC 50 for correction of a single bit (or nibble) error or detection of a double bit (or nibble) error in the 72 bit word read from the write FIFO 42. The any errors in the data fed to the EDAC 50 are reported to the control logic section 30. Further, the EDAC 50 appends to the data read from the write FIFO 42 (which is under the control of a control logic 51 in the control logic section 30) an error detection and correction code. The data read from the write FIFO 42 with the appended code is stored in the DRAM memory region 34 nder the control of the control logic 51.

When data is to be read from the DRAM memory region 34, the region 34 is addressed by the control logic 51 and the read data passes through EDAC 52 for error detection and correction. Any detected errors are reported to the control logic section 30. The data read from the DRAM memory region 34, with an appended EDAC code, is stored in the read FIFO 56 under control of the control logic 51. The data is then read from the read FIFO 56 and placed on the data portion of the bus A.

Figure 5:
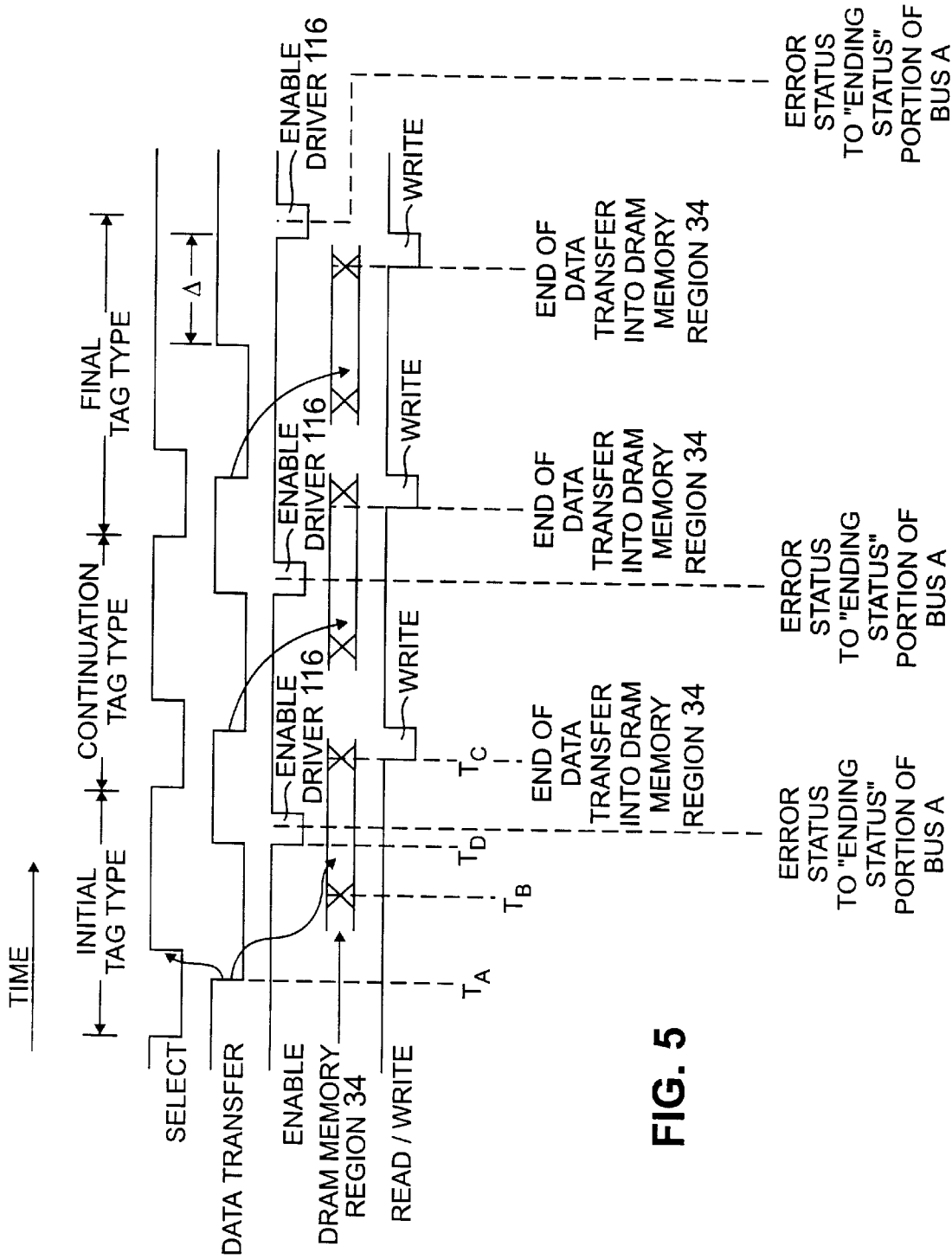
FIG. 5 is a timing diagram useful in understanding the operation of a cumulative error status processing section used in the addressable memory section of FIG. 2.

Each data transfer is made up of a series of bursts. Further, each one of the bursts in a data transfer request has a tag number (#) unique to such request. Also included with each batch is a batch type. The first batch type in the data transfer is an INITIAL type. The final, or last batch in the data transfer is a FINAL type. The batches between the INITIAL and FINAL type are CONTINUATION types. The control logic section 30 has a cumulative error status storage section 100. A timing diagram useful in understanding the operation of the cumulative error status processing section 100 is shown in FIG. 5. The section 100 includes a tag number (#) and tag type decoder 60 coupled to the address/command portion of bus A. The address/command portion of bus A includes the Tag number and type as well as DRAM memory region 34 commands (i.e., read or write). The data is on the DATA portion of the bus A which is to be written into DRAM memory region 34, if a write command. Data read from the DRAM memory region 34 is placed on the DATA portion of bus A.

The decoder 60 is used decode the Tag number and type. The tag number and type are stored in a latch 62. The data in the latch 62 are used by a controller 64 to provide pulses to a first look-up Table 110, an accumulation error status storage 66 (i.e. here a RAM), a second look-up Table 114, and an output driver 116. The data stored in the first look-up Table 110 is represented below to show the relation between an output produced by the first look-up Table 110 and an input fed to the first Table 110. More particularly, the error status of the data transfer at the end of such data transfer (i.e., the "current error status" of either a write operation or a read operation) is fed as a first input to the first Table 110 through an error status decoder 68 and the type of Tag is fed as a second input to such Table 110 by controller 64. The error status decoder is fed by the EDAC section 36, as shown. The prior accumulated error status from accumulated error status storage 66 is a third input for the first Table 110. The relationships stored in Table 110 are shown below:

| CURRENT ERROR STATUS | | CONTINUATION OR FINAL TYPE TAG | | | INITIAL TYPE TAG |
|---|---|---|---|---|---|
| | OK | | CORRECTABLE | UN-CORRECTABLE | |
| OK | OK | | CORRECTABLE | UN-CORRECTABLE | OK |
| CORRECTABLE | CORRECTABLE | CORRECTABLE | | UN-CORRECTABLE | CORRECTABLE |
| UN-CORRECTABLE | UN-CORRECTABLE | UN-CORRECTABLE | UN-CORRECTABLE | | UN-CORRECTABLE |

Thus, if the Tag is an INITIAL type tag, and the "current error status" is OK, the output of the Table 110 is OK. If the Tag is an INITIAL type tag, and the "current error status" is CORRECTABLE, the output of the Table 110 is "Correctable". If the Tag is an INITIAL type tag, and the "current error status" is UN-CORRECTABLE, the output of the Table 110 is "UN-CORRECTABLE".

If the Tag is not an INITIAL type tag (i.e., either a CONTINUATION type tag or a FINAL type tag) the following rules apply:

(I) If the accumulated error status is OK and the current error status is OK, the output of the Table 110 is OK. If the accumulated error status is OK and the current error status is CORRECTABLE, the output of the Table 110 is CORRECTABLE. If the accumulated error status is OK and the current error status is UN-CORRECTABLE, the output of the Table 110 is UN-CORRECTABLE.

(II) If the accumulated error status is CORRECTABLE and the current error status is OK, the output of the Table 110 is CORRECTABLE. If the accumulated error status is CORRECTABLE and the current error status is CORRECTABLE, the output of the Table 110 is CORRECTABLE. If the accumulated error status is UN-CORRECTABLE and the current error status is OK, the output of the Table 110 is UN-CORRECTABLE.

(III) If the accumulated error status is UN-CORRECTABLE and the current error status is OK, the output of the Table 110 is UN-CORRECTABLE. If the accumulated error status is UN-CORRECTABLE and the current error status is CORRECTABLE, the output of the Table 110 is UN-CORRECTABLE. If the accumulated error status is UN-CORRECTABLE and the current error status is UN-CORRECTABLE, the output of the Table is UN-CORRECTABLE.

The output of Table 110 is stored in the accumulated error status storage (RAM) 66 at the address specified by the tag number (#) indicated by the controller 64 during a write pulse supplied by controller 64 after the data has been written into the DRAM memory region 34, in this write operation example. During a read operation, the write pulse is supplied by the controller 64 after the data read from the DRAM memory region 34.

The output of storage 66 is fed to the Table 110 as the accumulated error status input to the Table 110 and as one input to Table 114. The other input to Table 114 is the tag type supplied by the controller 64. The output of Table 114 is fed to a driver 116. When enabled by an enable signal supplied to the driver 116 by controller 64 (FIG. 5), the output of Table 114 is presented as an error status signal on the "ending status" portion of bus A, for example. The relationship between Tag type and accumulated error status in the second Table 114 is shown below:

| ACCUMULATED ERROR STATUS | TAG TYPE | | |
|---|---|---|---|
| | INITIAL | CONTINUATION | FINAL |
| OK | OK | OK | OK |
| CORRECTABLE | OK | OK | OK |
| UN-CORRECTABLE | OK | UN-CORRECTABLE | UN-CORRECTABLE |

Thus:

(I) If the TAG type is INITIAL and the accumulated error status is OK, the output of the Table 114 is OK. If the TAG type is INITIAL and the accumulated error status is CORRECTABLE, the output of the Table 114 is OK. If the TAG type is INITIAL and the accumulated error status is UN-CORRECTABLE, the output of the Table 114 is OK.

(II) If the TAG type is CONTINUATION and the accumulated error status is OK, the output of the Table 114 is OK. If the TAG type is CONTINUATION and the accumulated error status is CORRECTABLE, the output of the Table 114 is OK. If the TAG type is CONTINUATION and the accumulated error status is UN-CORRECTABLE, the output of the Table 114 is UN-CORRECTABLE.

(III) If the TAG type is FINAL and the accumulated error status is OK, the output of the Table 114 is OK. If the TAG type is FINAL and the accumulated error status is CORRECTABLE, the output of the Table 114 is CORRECTABLE. If the TAG type is FINAL and the accumulated error status is UN-CORRECTABLE, the output of the Table 114 is UN-CORRECTABLE.

Figure 3:
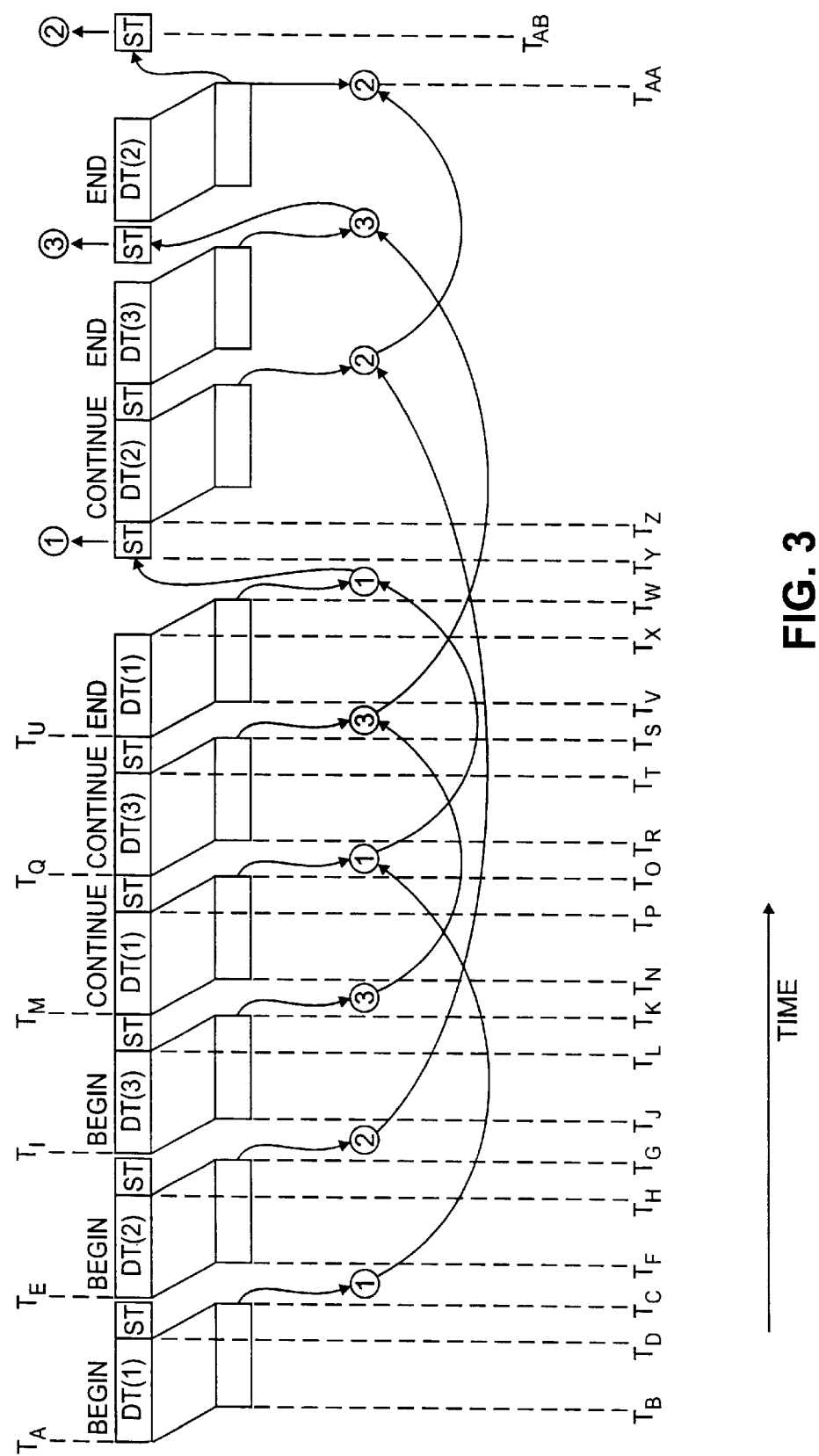
FIG. 3 is a timing diagram showing data transfer bursts processed by the system of FIG. 1.
Figure 4:
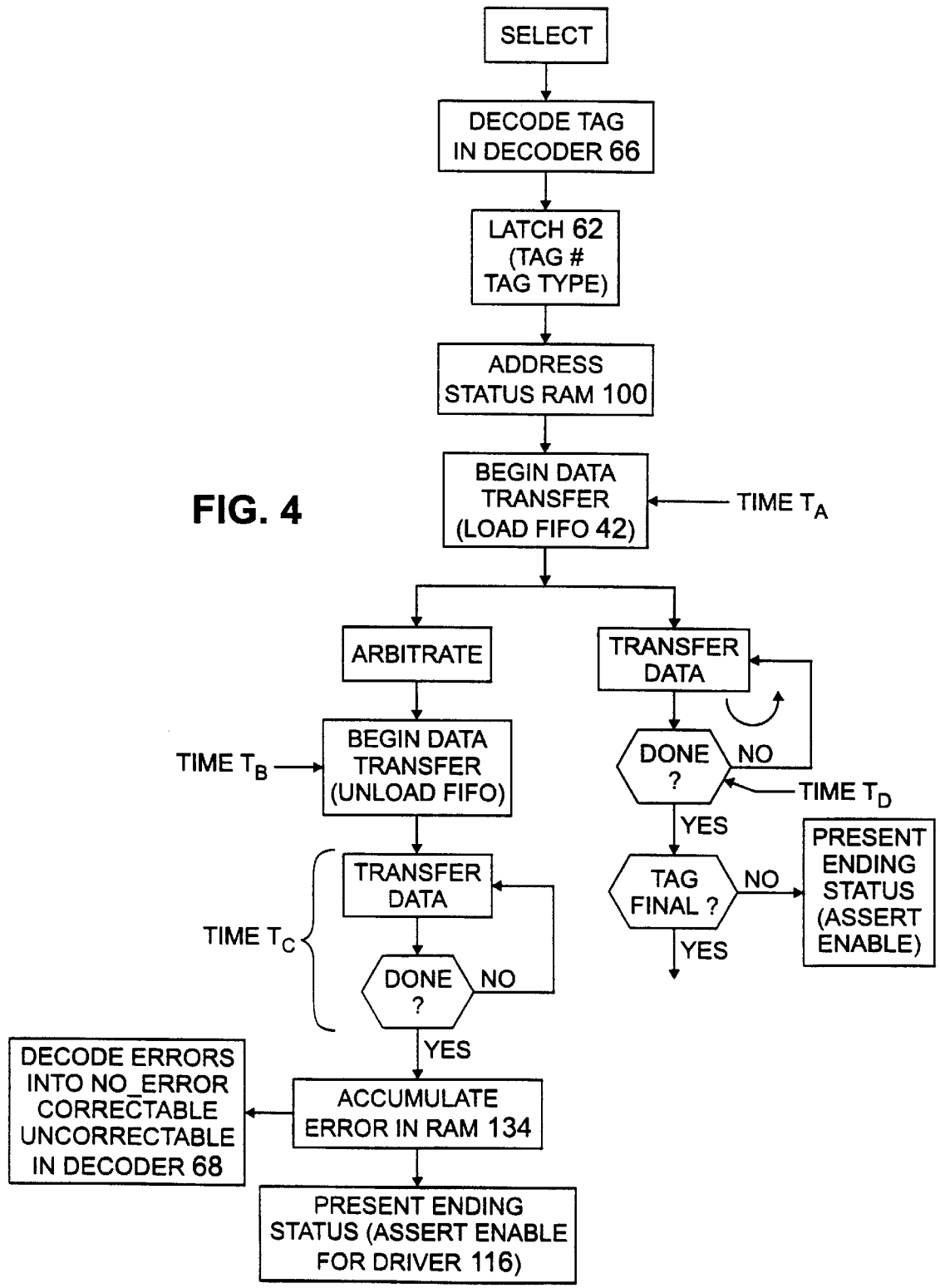
FIG. 4 is a flow diagram showing processing of data transfer bursts illustrated in FIG. 3.

The process is summarized in FIGS. 3 and 4. Here, in this example, a controller 20, 22 selects a transfer and begins a data transfer (e.g., $DT_1$) at time $T_A$, such $DT_1$, having assigned to it a TAG $T_1$. The tag number is requested by the controller 20, 22 and such tag is supplied by one of the addressable memories 24a–24d. The tag number and type are decoded in decoder 60 and latched into latch 62 (FIG. 1). The contents of the latch 62 are fed to a controller 64. The controller uses the tag number (#) information to address an accumulation error status storage region 66, here a RAM. The data on bus A, for example, is written into the write FIFO 42. Any arbitration for the DRAM memory region 34 among other buses, B, C, or D, in this example is performed in accordance with a bus arbitration procedure described in co-pending patent application entitled "Bus Arbitration System", filed Dec. 23, 1997, inventors Christopher S. MacLellan and myself, John K. Walton, assigned to the same assignee as the present invention, the entire subject matter thereof being incorporated in this patent application.

When bus A is granted access to the DRAM memory region 34 after any bus arbitration, the data with any appended EDAC 50 code begins its transfer into the DRAM memory region 34. Here, in this example, the data transfer is a write request wherein the controller 20, 22 requests that data on the bus A, for example, be written into an addressed addressable memory 24a. At time $T_B$, the data on the bus A begins its data transfer into the DRAM memory region 34 of the addressed memory 24a. Because this is the first burst $B_1$ in the $DT_1$, the tag is a "beginning", or INITIAL type tag i.e., $TAG_i$. Thus, the tag number and type associated with this burst is here designated by the requesting controller 20, 22 as $TAG_{1I}$. The storing of the burst $B_1$ of $DT_1$ (designated $B_1DT_1$) in DRAM memory region 34 is complete at time $T_C$. It is noted that the error status of the burst $B_1DT_1$ is not known at the end of the time, i.e., time $T_D$ that the controller 20, 22 completes assertion of its data transfer request on the bus A because the burst $B_1DT_1$ has not been completely transferred through the write FIFO 42 and then into the DRAM memory region 34. However, a reset, or initialized error status, here OK is transmitted to the requesting controller 20, 22 on the "ending status" portion of the bus A beginning at the completion of the $B_1DT_1$ request i.e., at time $T_D$. Thus, the "ending status" portion of the bus A reports to such controller 20, 22 that the data transfer of $B_1DT_1$ is OK.

It is noted however, that when the data transfer to the DRAM memory region 34 is completed, the error status of the data transfer is known and is stored in the control logic storage section 100, albeit after the OK error status, is reported to the controller 20, 22 on the "ending status" portion of bus A. More particularly, at the end of the data transfer into the DRAM memory region 34, the OK error status is decoded in decoder 68 and stored in the storage region 66 at a location corresponding to the decoded tag number.

At time $T_E$, a controller 20, 22 begins a data transfer (e.g., $DT_2$), such $DT_2$ having assigned to it a TAG $T_2$. Here, in this example, the data transfer is a write request wherein the controller 20, 22 requests that data on the bus be written into an addressed memory. At time $T_F$, the data on the bus A begins its data transfer into the DRAM memory region 32 of the addressed memory 24a. Because this is the first burst $B_1$ in the $DT_2$, (i.e., designated $B_1DT_2$) the tag is a "beginning", or INITIAL type tag i.e., $TAG_I$. Thus, the tag number and type associated with this burst is here designated by the requesting controller 20, 22 as $TAG_{2I}$. The storing of the burst $B_1DT_2$ in DRAM memory region 34 is complete at time $T_G$. It is noted that the error status of the burst $B_1DT_2$ is not known at the end of the time, i.e., time $T_H$, that the controller completes assertion of its request on the bus A because the burst $B_1DT_2$ has not been completely transferred through the write FIFO 42 and then into the DRAM memory region 34. However, a reset, or initialized, error status, here OK is transmitted to the requesting controller 20, 22 on the "ending status" portion of the bus A beginning at the completion of the $B_1DT_2$ request i.e, at time $T_H$. Thus, the "ending status" portion of the bus A is used to report to such controller 20, 22 that the data transfer of $B_1DT_2$ is OK. It is noted however, that when the data transfer to the DRAM memory region 34 is completed, the error status of the data transfer is known and is stored in the control logic storage section 100, albeit after the OK error status is reported to the controller on the "ending status" portion of bus A. More particularly, at the end of the data transfer into the DRAM memory region 34, the OK error status is decoded in decoder 68 and stored in the storage region 66 at a location corresponding to the decoded tag number.

At time $T_I$, a controller 20, 22 begins a data transfer (e.g., $DT_3$), such $DT_3$ having assigned to it a TAG $T_3$. Here, in this example, the data transfer is a write request wherein the controller 20, 22 requests that data on the bus A be written into an addressed memory 24a. At time $T_J$, the data on the bus A begins its data transfer into the DRAM memory region 34 of the addressed memory 24a. Because this is the first burst $B_1$ in the $DT_3$, (i.e., designated $B_1DT_3$) the tag is a "beginning", or INITIAL type tag i.e., $TAG_I$. Thus, the tag number and type associated with this burst by the requesting controller 20, 22 is here designated $TAG_{3I}$. The storing of the burst $B_1DT_3$ in DRAM memory region 34 is complete at time $T_K$. It is noted that the error status of the burst $B_1DT_3$ is not known at the end of the time, i.e., time $T_L$, that the controller 20, 22 completes assertion of its request on the bus A because the burst $B_1DT_3$ has not been completely transferred through the write FIFO 42 and then into the DRAM memory region 34. However, a reset, or initialized, error status, here OK is transmitted to the requesting controller 20, 22 on the "ending status" portion of the bus A beginning at the completion of the $B_1$ request i.e, at time $T_L$. Thus, the "ending status" portion of the bus A is used to report to such controller 20, 22 that the data transfer of $B_1DT_3$ is OK. It is noted however, that when the data transfer to the DRAM memory region 34 is completed, the error status of the data transfer is known and is stored in the control logic storage section 100, albeit after the OK error status is reported to the controller 20, 22 on the "ending status" bus. More particularly, at the end of the data transfer into the DRAM memory region 34, the OK error status is decoded in decoder 68 and stored in the storage region 66 at a location corresponding to the decoded tag number.

At time $T_M$, a controller sends a second burst $B_2$ of the data transfer $DT_1$. The burst is tagged with tag number TAG $T_1$. The burst is here indicated as burst $B_2DT_1$. It is noted that since this is not the first burst associated with $DT_1$, (and, as will be seen, is not the final burst associated with $DT_1$), the tag type associated with $B_2DT_1$ is $TAG_C$ representative of a CONTINUATION type tag. Thus, the tag number and tag type of burst $B_2DT_1$ is here $TAG_{1C}$. At time $T_N$, the data on the bus begins its data transfer into the RAM region 34 of the addressed memory 24a. The storing of the burst $B_2DT_1$ in DRAM memory region 34 is complete at time $T_O$, It is noted that the error status of the burst $B_2DT_1$ is not known at the end of the time, i.e., time $T_P$, that the controller 20, 22 completes assertion of its request on the bus A because the burst $B_2DT_1$ has not been completely transferred through the write FIFO 42 into the DRAM memory region 34. However, the control logic 30 has stored in storage section 100 thereof the error status of the burst $B_1DT_1$. If the error status of burst $B_1DT_1$ was a CORRECTABLE fault (i.e., an error which is correctable by Error Detection And Correction (EDAC) 36 within the buffer memory 32, the control logic section 30 reports to the controller 20, 22 requesting the data transfer an OK error status on the "ending status" portion of the bus A beginning at the completion of the $B_2DT_1$ request i.e, at time $T_P$. If, however, the error status of burst $B_1DT_1$ was an UN-CORRECTABLE fault (i.e., an error which is DETECTABLE, but UN-CORRECTABLE by Error Detection And Correction (EDAC) 36 within the buffer memory 32), the buffer memory 32 reports to the control logic section 30 an "un-correctable fault" to the requesting controller 20, 22 on the "ending status" portion of the bus A beginning at the completion of the $B_2DT_1$ request i.e, at time $T_P$. It is noted however, that when the data transfer to the RAM region 34 is completed, the error status of the data transfer is known and is accumulated with the error status of burst $B_1DT_1$, the accumulated error status being stored in the control logic storage section 100, albeit after the error status is reported to the controller 20, 22 on the "ending status" portion of the bus A. More particularly, at the end of the data transfer into the DRAM memory region 34, the error status is decoded in decoder 68 and accumulated with the previous error status stored in the storage region 66 at a location corresponding to the decoded tag number.

At time $T_Q$, a controller 20, 22 sends a second burst $B_2$ of the data transfer $DT_3$. The burst is tagged with tag number TAG $T_3$. The burst is here indicated as burst $B_2DT_3$. It is noted that since this is not the first burst associated with $DT_3$, (and is not the final burst associated with $DT_3$), the tag type associated with $B_2DT_3$ is a CONTINUATION type tag, $TAG_C$. Thus, the tag number and tag type of burst $B_2DT_3$ is here $TAG_{3C}$. At time $T_R$, the data on the bus A begins its data transfer into the DRAM memory region 32 of the addressed memory 24a. The storing of the burst $B_2DT_3$ in DRAM memory region 34 is complete at time $T_S$. It is noted that the error status of the burst $B_2DT_3$ is not known at the end of the time, i.e., time $T_T$, that the controller 20, 22 completes assertion of its request on the bus A because the burst $B_2DT_3$ has not been completely transferred though the write FIFO 42 and then into the DRAM memory region 34. However, the control logic 30 section has error status in it the error status of the burst $B_1DT_3$. If the error status of burst $B_1DT_3$ was a correctable fault (i.e., an error which is correctable by Error Detection And Correction (EDAC) 36 within the buffer memory 32, the buffer memory 32 reports to the control logic 30 section OK to the requesting controller on the "ending status" portion of the bus A beginning at the completion of the $B_2DT_3$ request i.e, at time $T_T$. If, however, the error status of burst $B_1DT_3$ was an UN-CORRECTABLE fault (i.e., an error which is DETECTABLE, but correctable) the control logic section 30 reports an UN-Correctable error status to the requesting controller 20, 22 on the "ending status" portion of the bus A beginning at the completion of the $B_2DT_3$ request i.e, at time $T_T$. It is noted however, that when the data transfer to the RAM region 34 is completed, the error status of the data transfer is known and is accumulated with the error status of burst $B_1DT_3$, the accumulated error status being stored in the control logic storage section 100, albeit after the error status is reported to the requesting controller 20, 22 on the "ending status" portion of bus A. More particularly, at the end of the data transfer into the DRAM memory region 34, the error status is decoded in decoder 68 and accumulated with the previous error status stored in the storage region 66 at a location corresponding to the decoded tag number.

The process repeats in like manner for CONTINUATION type tags. Here, at time $T_U$, a controller sends a third burst $B_3$ of the data transfer $DT_1$. The burst is tagged with tag number TAG $T_1$. The burst is here indicated as burst $B_{3DT1}$. It is noted that here the third burst for $DT_1$ is the final burst in $DT_1$. Thus, the tag type associated with $B_{3DT1}$ is a FINAL type tag indication represented by TAGF. Thus, the tag number and tag type of burst $B_{3DT1}$ is here $TAG_{1F}$. At time $T_V$, the data on the bus A begins its data transfer into the DRAM memory region 34 of the addressed memory 24a. The storing of the burst $B_3DT_1$ in DRAM memory region 34 is complete at time $T_W$. It is noted that the error status of the burst $B_3DT_1$ is not known at the end of the time, i.e., time $T_X$, that the controller 20, 22 completes assertion of its request on the bus A because the burst $B_3DT_1$ has not been completely transferred through the write FIFO 42 into the RAM region 34. However, the control logic 30 knows that the type of burst is the FINAL type tag burst in the data transfer $DT_1$ because the tag type is decoded by the decoder 60 in the control logic section 30. Thus, now the control logic section 30 waits for completion of the data transfer to determine its error status, accumulates its error status with the accumulated error status stored in the control logic storage 100, and reports the final accumulated error status to the data transfer $DT_1$ controller 20, 22 beginning at time $T_Y$ on the "ending status" portion of the bus A. It is noted that when there has been no UN-CORRECTABLE faults detected in the total data transfer of $DT_1$, the only time taken to report the final error status to the data transfer requesting controller 20, 22 is A rather than 3A.

The process continues as indicated. It is noted that the $DT_2$ is complete in the addressable memory 24a at time $T_{AA}$ and the accumulated error status is report at time $T_{AB}$, assuming that no UN-CORRECTABLE faults have been detected in bursts of $DT_2$ previously.

It should be noted that an equivalent process is used in reporting errors during a read operation. Thus, referring to FIG. 2, here errors are reported to the error status decoder 68 from EDAC 52. The driver 116 is enabled after each data transfer is read from the read buffer FIFO 56.

Other embodiments are within the spirit and scope of the appended claims.

What is claimed is:

1. A data storage system wherein a host computer section having host computer processors for processing data is coupled to a bank of disk drives through an interface, such interface comprising:
 (A) a plurality of addressable memories coupled to a bus;
 (B) a plurality of controllers coupled to the bus, each one thereof being adapted to request a data transfer between the bus and an addressed one of the addressable memories, each such request being transmitted to the addressed one of the memories in a series of bursts, each one of the bursts in a request having a tag unique to such request;
 wherein each one of the addressable memories has:
  (i) an error detector for detecting an error in the addressable memory transferring data between the bus and the addressable memory; and
  (ii) a control logic section for storing a cumulative error message produced in response to the error detector processing each one of the bursts of requests and for reporting the cumulative error to the one of the controllers making such request at the end of the series of bursts.

2. The system recited in claim 1 wherein the one of the controllers making such request provides with each of the data transfer requests a beginning burst indication and a final burst indication to enable the one of the requesting controllers making the request to determine the cumulative error occurring during the series of bursts.

3. The system recited in claim 2 wherein the one of the controllers making such request provides a continuation burst indication when there are more than two bursts in the series.

4. The system recited in claim 3 wherein the control logic section responds to these indications in providing the cumulative error.

5. The system recited in claim 4 wherein the control logic section identifies a plurality of different types of errors.

6. The system recited in claim 5 wherein the types of errors include: no error; a correctable; and an un-correctable error.

7. The system recited in claim 6 wherein when the correctable type error is identified such type error is accumulated in the control logic section and the accumulated error is reported in response to the final burst indication.

8. The system recited in claim 7 wherein when an un-correctable type error is identified such type error is reported when such error is detected.

9. A data storage system wherein a host computer section having host computer processors for processing data is coupled to a bank of disk drives through an interface, such interface comprising:
 (A) a bus;
 (B) a plurality of addressable memories coupled to the bus;
 (C) a plurality of controllers coupled to the bus, each one thereof being adapted to request a data transfer between the bus and an addressed one of the addressable memories, each such request being transmitted to the addressed one of the memories in a series of bursts, each one of the series of bursts in such request having a tag unique to such request, the bursts from one of the requesting controllers to the one of the addressed memories addressed by such one of the controllers being interleaved with bursts of requests from another one of the requesting controllers to one of the addressed memories addressed by such another one of the controllers;

(D) wherein each one of the addressable memories has;
  (a) a control logic section coupled to the bus for receiving the request from the one of the controllers addressing such one of the addressable memories, such control logic sections having a storage section;
  (b) a buffer memory coupled to the bus;
  (c) a random access memory coupled to the bus through the buffer memory; and
  (c) an error detector in the buffer memory for detecting an error in the addressable memory transferring data between the bus and the random access memory; and
  (d) wherein the control logic section stores in the storage section a cumulative error message produced in response to the error detector processing each one of the bursts in one of the requests and for reporting the cumulative error to the one of the controllers making such request at the end of the series of bursts in such request.

10. The system recited in claim 9 wherein the one of the controllers making the request provides with each of the data transfer requests a beginning burst indication and a final burst indication at the end of the series of bursts in the series of requests.

11. The system recited in claim 10 wherein the one of the controllers making the request provides a continuation burst indication when there are more than two bursts, in the series of bursts.

12. The system recited in claim 11 wherein the control logic section responds to these indications in providing the cumulative error.

13. The system recited in claim 12 wherein the control logic section identifies a plurality of different types of errors.

14. The system recited in claim 13 wherein the types of errors include: no error; a correctable; and an un-correctable error.

15. The system recited in claim 14 wherein when the correctable type error is identified such type error is accumulated in the control logic section and the accumulated error is reported in response to the final burst indication.

16. The system recited in claim 15 wherein when an un-correctable type error is identified such type error is reported when such error is detected.

\* \* \* \* \*